US012392451B2

(12) United States Patent
Allidieres et al.

(10) Patent No.: US 12,392,451 B2
(45) Date of Patent: Aug. 19, 2025

(54) FLUID SUPPLY AND STORAGE DEVICE, VEHICLE AND METHOD INCLUDING SUCH A DEVICE

(71) Applicant: L'Air Liquide, Societe Anonyme pour l'Etude et l'Exploitation des Procedes Georges Claude, Paris (FR)

(72) Inventors: Laurent Allidieres, Paris (FR); Jerome Losco, Sassenage (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 497 days.

(21) Appl. No.: 17/719,459

(22) Filed: Apr. 13, 2022

(65) Prior Publication Data
US 2022/0325853 A1    Oct. 13, 2022

(30) Foreign Application Priority Data
Apr. 13, 2021   (FR) ...................................... 2103778

(51) Int. Cl.
F17C 3/08      (2006.01)
F17C 9/04      (2006.01)
F17C 13/04     (2006.01)

(52) U.S. Cl.
CPC ................. F17C 3/08 (2013.01); F17C 9/04 (2013.01); F17C 13/04 (2013.01);
(Continued)

(58) Field of Classification Search
CPC .... F17C 3/08; F17C 9/04; F17C 13/04; F17C 2201/0109; F17C 2201/035; F17C 2203/0391; F17C 2203/0629; F17C 2205/0326; F17C 2205/0394; F17C 2221/012; F17C 2223/013;
(Continued)

(56) References Cited

U.S. PATENT DOCUMENTS 5,644,921 A       7/1997  Chowdhury
6,634,178 B1 *   10/2003  Michel .................. F17C 13/025
                                                            62/48.1
(Continued)

FOREIGN PATENT DOCUMENTS

CN    103615657 A  *  3/2014
CN    106989272 A  *  7/2017
(Continued)

OTHER PUBLICATIONS

French Search Report for FR 2 103 778, mailed Jan. 14, 2022.

Primary Examiner — Jianying C Atkisson
Assistant Examiner — Ibrahim A. Michael Adeniji
(74) Attorney, Agent, or Firm — Justin K. Murray

(57) ABSTRACT

A liquefied fuel cryogenic tank has an inner jacket delimiting a fluid storage volume and an outer jacket disposed around the inner jacket with a vacuum thermal insulation gap therebetween. A withdrawal circuit has an assembly of one or more valves and a withdrawal line that has a first heating heat exchanger located outside the inner jacket and a second heating heat exchanger located inside the inner jacket. Fluid flows through the withdrawal line via the first heat exchanger and then the second heat exchanger or via the first heat exchanger without entering the second heat exchanger.

18 Claims, 2 Drawing Sheets

(52) U.S. Cl.
CPC ............ *F17C 2201/0109* (2013.01); *F17C 2201/035* (2013.01); *F17C 2203/0391* (2013.01); *F17C 2203/0629* (2013.01); *F17C 2205/0326* (2013.01); *F17C 2205/0394* (2013.01); *F17C 2221/012* (2013.01); *F17C 2223/013* (2013.01); *F17C 2223/033* (2013.01); *F17C 2225/0123* (2013.01); *F17C 2227/0302* (2013.01); *F17C 2227/0379* (2013.01); *F17C 2227/0381* (2013.01); *F17C 2227/0388* (2013.01); *F17C 2227/048* (2013.01); *F17C 2270/0105* (2013.01)

(58) Field of Classification Search
CPC ........ F17C 2223/033; F17C 2225/0123; F17C 2227/0302; F17C 2227/0379; F17C 2227/0381; F17C 2227/0388; F17C 2227/048; F17C 2270/0105; F17C 2201/054; F17C 2201/056; F17C 2205/0332; F17C 2205/035; F17C 2223/0161; F17C 2223/043; F17C 2225/035; F17C 2227/0107; F17C 2227/0306; F17C 2227/0311; F17C 2227/0316; F17C 2227/0374; F17C 2227/0393; F17C 2250/032; F17C 2250/043; F17C 2250/0439; F17C 2265/066; F17C 2270/0171; F17C 2270/0184; F17C 2270/0189; F17C 7/04; F17C 3/025; F17C 3/085; F17C 13/00; F17C 2203/0619; F17C 2205/0323; F17C 2227/0369; F17C 9/02; F17C 13/025; Y02E 60/32; Y02E 60/34; Y02E 60/50; B60K 15/03006; B60K 2015/03026; B60K 2015/03315; H01M 8/04089; H01M 8/04208; H01M 2250/20; Y02T 90/40

See application file for complete search history.

(56) References Cited

U.S. PATENT DOCUMENTS

| | | | |
|---|---|---|---|
| 6,983,611 B2 * | 1/2006 | Reese | F17C 9/04 |
| | | | 62/50.1 |
| 9,746,132 B2 | 8/2017 | Gustafson et al. | |
| 2007/0144183 A1 * | 6/2007 | Sakajo | B60H 1/14 |
| | | | 62/7 |
| 2009/0288426 A1 | 11/2009 | Lilletvedt et al. | |
| 2013/0061608 A1 * | 3/2013 | Lurken | F17C 9/00 |
| | | | 62/53.2 |
| 2015/0072260 A1 | 3/2015 | Brunner et al. | |
| 2018/0306383 A1 | 10/2018 | Poag et al. | |
| 2019/0113259 A1 * | 4/2019 | Levin | F25B 17/086 |
| 2021/0372565 A1 * | 12/2021 | Beuneken | F17C 5/06 |
| 2021/0372570 A1 * | 12/2021 | Stubenrauch | F17C 3/00 |
| 2022/0026028 A1 * | 1/2022 | Beuneken | F17C 13/025 |
| 2022/0146047 A1 * | 5/2022 | Bensadoun | F17C 5/007 |

FOREIGN PATENT DOCUMENTS

| | | | |
|---|---|---|---|
| DE | 43 20 556 | 12/1994 | |
| EP | 1 521 933 | 12/2009 | |
| EP | 2 813 746 | 12/2014 | |
| FR | 2 706 822 | 12/1994 | |
| WO | WO-9954657 A1 * | 10/1999 | ......... F02M 21/0221 |

* cited by examiner

[Fig. 1]
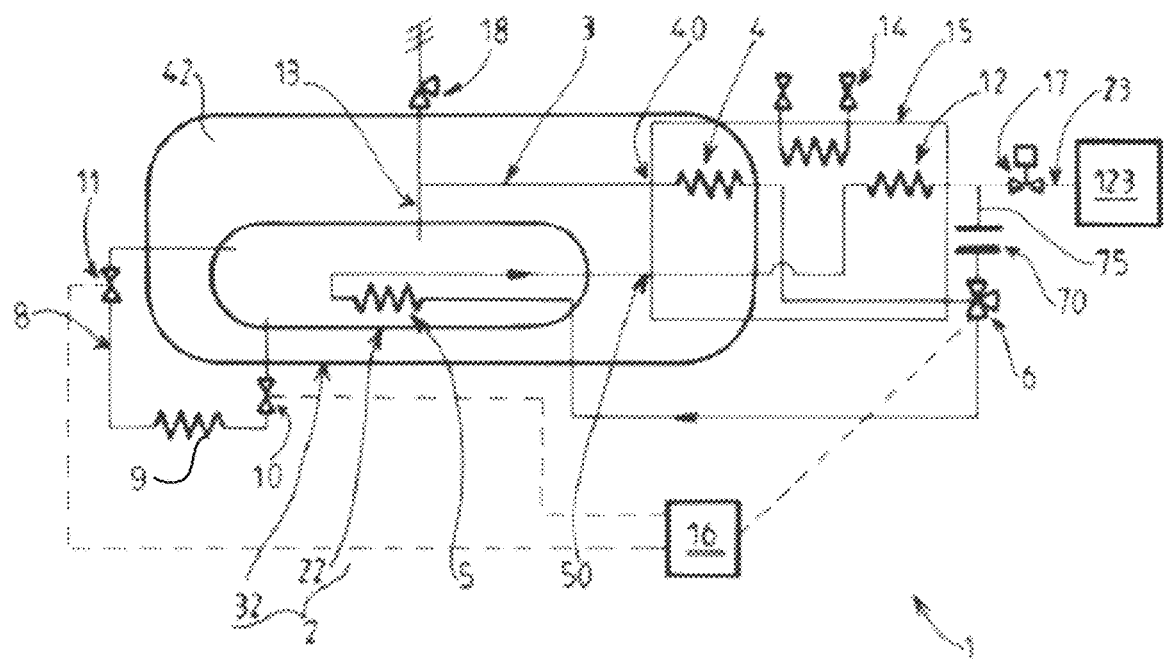
[Fig. 2]
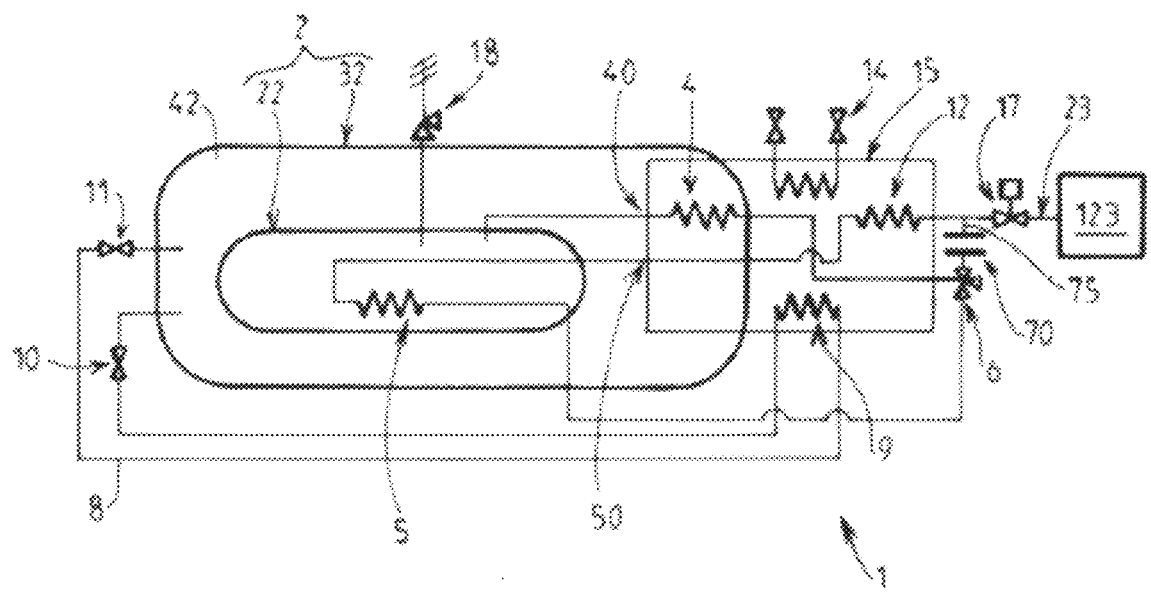

[Fig. 3]
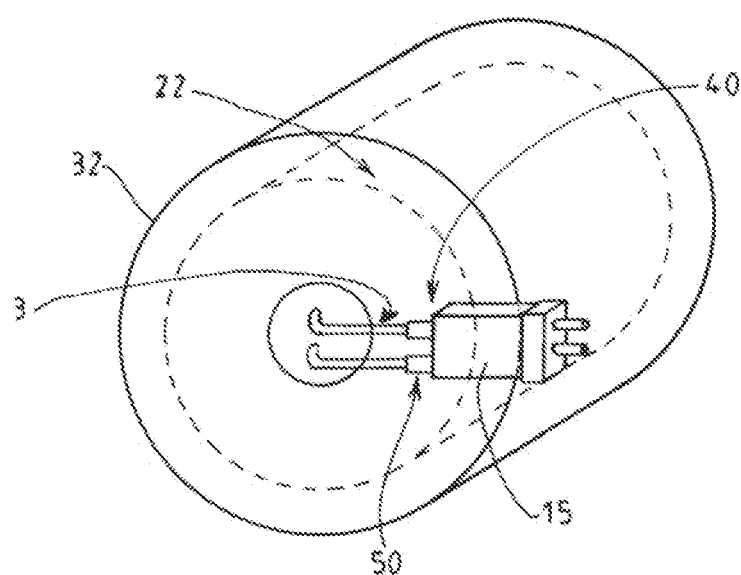
[Fig. 4]
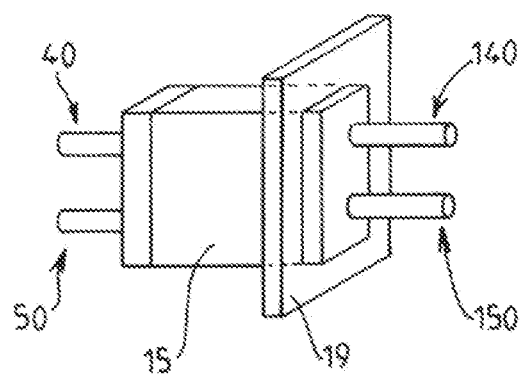

FLUID SUPPLY AND STORAGE DEVICE, VEHICLE AND METHOD INCLUDING SUCH A DEVICE

CROSS-REFERENCE TO RELATED APPLICATIONS

This application claims the benefit of priority under 35 U.S.C. § 119 (a) and (b) to French patent application No. FR 2103778, filed Apr. 13, 2021, the entire contents of which are incorporated herein by reference.

BACKGROUND

Field of the Invention

The invention relates to a fluid supply and storage device, to a vehicle and to a method including such a device.

The invention relates more particularly to a fluid supply and storage device, in particular an on-board device for storing hydrogen and supplying it to a user member, comprising a cryogenic tank for storing liquefied fluid of the double-wall and vacuum-insulated type comprising an inner jacket delimiting the fluid storage volume and an outer jacket disposed around the inner jacket with a vacuum thermal insulation gap between the two jackets, a withdrawal circuit comprising a withdrawal line comprising a first, upstream end connected to the upper part of the inner jacket and a second, downstream end intended to be connected to a user member, the withdrawal line comprising a first heating heat exchanger located outside the inner jacket and a second heating heat exchanger located inside the inner jacket, the withdrawal circuit comprising an assembly of one or more valves that is configured to ensure the passage of a flow of fluid circulating from the first end to the second end, in the process entering the first heat exchanger and then the second heat exchanger or in the process entering the first heat exchanger without entering the second heat exchanger.

Related Art

Such a device is described in document DE4329566A, for example.

The storage of hydrogen on board vehicles supplied with hydrogen fuel makes use of compressed gaseous hydrogen or hydrogen in liquid form.

If the stored capacities required are greater than 50 kg, on-board storage in liquid form is preferred. The liquid hydrogen is generally stored in a tank at low pressure (less than 13 bar absolute). At equilibrium, the temperature of the hydrogen is set by the pressure in the tank via the saturation curve between the liquid phase and the gaseous phase. This is applicable up to the critical point of the hydrogen, which occurs at a pressure slightly less than 13 bar absolute.

The liquid hydrogen is generally produced at a pressure close to atmospheric pressure, generally between 1.15 and 1.3 bar absolute, corresponding to a temperature of between 20.8 K and 21.2 K. It is transported and transferred into the on-board tank using cryogenic trucks and a filling station. Since the transport and transfer are sources of heat influx, the temperature of the hydrogen in the tank corresponds to a saturation pressure of about 2 bar absolute, or 22.9 K.

Fuel cells (or possibly hydrogen-powered internal combustion engines "ICE") operate in general at a pressure less than 2 bar absolute in the heart of the cell. However, for various operational reasons, most manufacturers require an interface pressure with the tank of between 3 and 5 bar absolute.

Since the full tank is initially at a lower pressure, it is then necessary to increase its pressure up to a pressure greater than that of the fuel cell (ICE) and to control this pressure as the gas is consumed. It is therefore necessary to include in the tank a means for controlling its pressure.

The abovementioned document provides a supply of pressurized gas in the tank. This makes the installation more complex. This mode of control is not used in industry likewise because of the large quantities of gas required.

Moreover, in the known devices, the relative arrangements of cold lines, hot lines, cold exchangers and hot exchangers generate heat losses which adversely affect the efficiency of the installation.

SUMMARY OF THE INVENTION

An aim of the present invention is to overcome all or some of the drawbacks of the prior art that are set out above.

To that end, the device according to the invention, moreover in accordance with the generic definition given in the preamble above, is essentially characterized in that the inlet of the first heat exchanger receiving the flow of fluid coming from the first end of the withdrawal line is located in the vacuum thermal insulation gap between the two jackets.

Furthermore, embodiments of the invention may include one or more of the following features:

- at least a part of the first heat exchanger which is adjacent to the inlet receiving the flow of fluid coming from the first end of the withdrawal line is located in the vacuum thermal insulation gap between the two jackets,
- the first heat exchanger is housed in an exchanger housing, at least one portion of which is located in the vacuum thermal insulation gap between the two jackets,
- the housing comprises a first inlet receiving the flow of fluid coming from the first end of the circuit, said first inlet being located in the vacuum thermal insulation gap between the two jackets,
- the housing accommodates a part of the withdrawal circuit connecting the second heat exchanger to the second end, the housing comprising a second inlet receiving the flow of fluid coming from the second exchanger, said second inlet being located in the vacuum thermal insulation gap between the two jackets,
- the withdrawal circuit has a third heat exchanger disposed in series downstream of the second heat exchanger such that the third heat exchanger receives the flow that has passed into the second heat exchanger,
- the third heat exchanger is located outside the vacuum thermal insulation gap between the two jackets and in particular at least partially outside the outer jacket,
- the first heat exchanger and the third heat exchanger are housed in one and the same exchanger housing in a heat-exchange relationship with at least one flow of heat-transfer fluid,
- the assembly of one or more valves comprises a three-way valve, the ports of which are connected respectively to an outlet of the first heat exchanger, to an inlet of the second heat exchanger, and to the second end of the withdrawal line via a portion of the withdrawal circuit forming a bypass of the third heat exchanger, the portion of the withdrawal circuit forming a bypass of the third heat exchanger comprises a flow rate limiting member, such as a calibrated orifice, the device moreover comprises a system for pressurizing the tank, comprising a pressurization line separate from the withdrawal circuit and comprising two ends connected respectively to the upper part and the lower part of the inner jacket, a so vaporization heat exchanger and an assembly of one or more valves that is configured to allow liquid to be withdrawn from the tank, to be heated in the vaporization heat exchanger and to be reintroduced into the tank, the first heat exchanger, the third heat exchanger and the vaporization heat exchanger are housed in the same exchanger housing, the device has an electronic controller configured to control all or some of the assembly of one or more valves of the device, the device comprises a fuel cell or a motor connected at the second, downstream end.

The invention also relates to a vehicle, in particular a boat, comprising a device according to any one of the features mentioned above or below.

The invention also relates to a method for supplying fluid to a user member, by means of such a device or such a vehicle, wherein the user member is connected to the second end of the withdrawal circuit, the method comprising a step of supplying fluid from the tank to the user member by withdrawing liquefied fluid from the tank via the first withdrawal line, wherein, prior to the fluid supplying step, if the pressure within the tank is less than a determined threshold, the method comprises a step of pressurizing the tank via the system for pressurizing the tank up to a determined pressure level.

The invention may also relate to any alternative device or method comprising any combination of the features above or below within the scope of the claims.

BRIEF DESCRIPTION OF THE FIGURES

Further particular features and advantages will become apparent upon reading the following description, which is given with reference to the figures, in which:

FIG. 1 is a schematic and partial view illustrating the structure and the operation of a first exemplary embodiment of the invention, FIG. 2 is a schematic and partial view illustrating the structure and the operation of a second exemplary embodiment of the invention, FIG. 3 is a schematic and partial, perspective cross-sectional view of an example of such a device, illustrating the arrangement of a heat exchanger housing in the tank, FIG. 4 is a schematic and partial, perspective side view of an example of a heat exchanger housing.

DETAILED DESCRIPTION OF THE INVENTION

The fluid supply and storage device 1 illustrated may be a device which is on board a vehicle (boat or other vehicle) for storing hydrogen and supplying it to a user member, such as a fuel cell or a motor, for example.

The device 1 comprises a cryogenic tank 2 for storing liquefied fluid of the double-wall and vacuum-insulated type comprising an inner jacket 22 delimiting the fluid storage volume and an outer jacket 32 disposed around the inner jacket 22 with a vacuum thermal insulation gap 42 between the two jackets.

The device 1 has a withdrawal circuit comprising a withdrawal line 3 provided with a first, upstream end 13 connected to the inner jacket 22 (and preferably at the upper part) and a second, downstream end 23 intended to be connected to a user member.

The withdrawal line 3 comprises a first heating heat exchanger 4 located outside the inner jacket 22 and a second heating heat exchanger 5 located inside the inner jacket 22.

The withdrawal circuit moreover comprises an assembly of one or more valves 6 that is configured to ensure the passage of a flow of fluid circulating from the first end 13 to the second end 23, in the process entering the first heat exchanger 4 and then the second heat exchanger 5 or in the process entering solely the first heat exchanger 4.

That is to say that the withdrawal circuit has a line in which the first heat exchanger 4 and the second heat exchanger 5 are disposed in series between the first end 13 and the second end 23 and a bypass portion 75 connecting the outlet of the first heat exchanger 4 to the second end 23 without passing through the second heat exchanger 5.

The assembly of one or more valves 6 comprises for example a three-way valve, the ports of which are connected respectively to an outlet of the first heat exchanger 4, to an inlet of the second heat exchanger 5, and to the second end 23 via a bypass portion 75 bypassing the second heat exchanger 5.

This portion 75 of the withdrawal circuit preferably comprises a flow rate limiting member 70, such as a calibrated orifice or a valve, for example.

The three-way valve 6 may be of the proportional type (with, for example, some of the flow of fluid being directed to the second heat exchanger 5). Of course, any other type of valve(s) can be envisaged to ensure the routing or the distribution of the flows of fluid.

The inlet of the first exchanger 4 (the inlet receiving the flow of fluid coming from the first end 13 of the withdrawal line 3) is located in the vacuum thermal insulation gap 42 between the two jackets.

This makes it possible to localize the cold interfaces in the vacuum-insulated space.

Advantageously, at least a part of the first heat exchanger 4 which is adjacent to the inlet 40 receiving the flow of fluid coming from the first end 13 of the withdrawal line 3 is located in the vacuum thermal insulation gap 42. For example, a volume may be provided for this purpose at one end (for example longitudinal end) of the tank (which can be a vertical or horizontal tank).

As shown, the entirety of the first heat exchanger 4 may be housed in this inter-wall space 42.

For example, this first heat exchanger 4 may be housed in a sealed exchanger housing 15, at least one portion of which is located in the vacuum thermal insulation gap 42 between the two jackets.

The housing 15 may thus comprise a first inlet 40 receiving the flow of fluid coming from the first end 13 of the circuit. This first inlet 40 may be located at a terminal end of the housing 15 located in the vacuum thermal insulation gap 42 between the two jackets.

As illustrated, this housing 15 may also accommodate a part of the withdrawal circuit connecting the second heat exchanger 5 to the second end 23. To that end, the housing 15 may have a second inlet 50 receiving the flow of fluid coming from the second heat exchanger 5.

This second inlet 50 may be located adjacently to the first inlet 40, in the vacuum thermal insulation gap 42 between the two jackets.

The withdrawal circuit may have a third heat exchanger 12 disposed in series downstream of the second heat exchanger 5 such that the third heat exchanger 12 receives the flow that has passed into the second heat exchanger 5.

This third heat exchanger 12 is located outside the vacuum thermal insulation gap 42 between the two jackets and in particular at least partially outside the outer jacket 32.

As illustrated, this third heat exchanger 12 may also be housed in the housing 15. Of course, it could be disposed outside the housing and in particular further downstream of the latter.

In the example shown, the first heat exchanger 4 and the third heat exchanger 12 are housed in one and the same exchanger housing 15 which may be in a heat-exchange relationship with at least one flow 14 of heat-transfer fluid.

This housing 15 may be a heat exchanger of the multi-channel plate type (different channels for the different exchangers described above).

As illustrated, the device 1 preferably moreover comprises a system for pressurizing the tank 2, having a pressurization line 8 separate from the withdrawal circuit and comprising two ends respectively connected to the upper part and the lower part of the inner jacket 22. A vaporization heat exchanger 9 and an assembly of one or more valves 10, 11 are provided for this line 8 and are configured to allow liquid to be withdrawn from the tank 2, to be heated in the vaporization heat exchanger 9 and to be reintroduced into the tank 2. For example, two valves 10, 11 are disposed on either side of the vaporization heat exchanger 9.

Thus, this auxiliary pressurization system allows the initial pressurization of the tank and in particular the starting up of a fuel cell 123 connected to the second end 23.

This pressurization without using the withdrawal circuit allows initial pressurization, in particular when the necessary pressure is greater than the filling pressure, without consuming fluid.

In the embodiment of [FIG. 1], the vaporization heat exchangee 9 is located outside the housing 15 mentioned, whereas in the embodiment of [FIG. 2] the third heat exchanger 12 and the vaporization heat exchanger 9 are housed in the same exchanger housing 15.

As illustrated, this housing 15 may be integral with a mounting plate 19 which may be fixed to the outer face of the outer jacket 32. In the mounted position, this housing 15 may thus pass through the outer jacket 32 in a sealed manner (cold inlets 40, 50 for fluid in the vacuum-insulated cold part and hot outlets 140, 150 on the outside of the tank).

A control and/or safety valve 17 is preferably provided downstream of the third heat exchanger 12 at the second end 23 (upstream of the user member 123). A temperature and/or pressure sensor may also be provided at the outlet of this heat exchanger 12 (similarly at the first end 13 of the withdrawal circuit).

Thus, the assembly of one or more valves 6 makes it possible to withdraw gas from the tank 2, which is circulated in the first heat exchanger 4 then in the second heat exchanger 5 and subsequently in the third heat exchanger 12 before the second end 23. As an alternative, the assembly of one or more valves 6 makes it possible to withdraw gas from the tank 2, which is circulated solely in the first heat exchanger 4 before arriving at the second end 23.

As indicated above, a flow rate regulating and/or limiting member 70 is preferably provided in the withdrawal line 3 downstream of the assembly of one or more valves 6 and the second, downstream end 23, in the bypass portion bypassing the third heat exchanger 12.

This member 70 makes it possible to compensate for the pressure drops in the second heat exchanger 5 in particular.

As illustrated, preferably, a safety device 18 with a pressure relief valve is provided at the first end 13 so as to vent possible excess pressures from the tank 2.

A possible mode of operation of the device for supplying fluid to a user member 123 will now be described.

When the pressure in the tank 2 (in the inner jacket 22) is less than a determined threshold, the three-way valve 6 can be configured to transfer the fluid withdrawn from the tank 2 (and heated in the first heat exchanger 4) into the second heat exchanger 5 (in order to supply heat energy in the tank 2 and therefore increase its pressure). This fluid is then reheated in the third heat exchanger 12 before being supplied to the user member 123.

When the pressure in the tank is greater than a determined level, the three-way valve 6 can be configured to transfer the fluid withdrawn from the tank 2 (and heated in the first heat exchanger 4), without it passing through the second heat exchanger located in the tank 2, towards the user 123 (preferably via a flow rate limiting member 70).

In this mode, the liquid and gas phases can be kept in thermodynamic equilibrium. Thus, in steady-state operation, the withdrawn gas in the tank 2 comes from the evaporation of liquid caused by the second heat exchanger 5. Since this gas has bubbled through the liquid present in the tank, it is in thermodynamic equilibrium with the liquid. The pressure in the tank 2 is therefore set by the temperature of the liquid and of the gas. This mode of operation therefore makes it possible to have a tank 2 in which the liquid is in thermal equilibrium with the gas. In this case, if the tank is shaken, the mixture of the liquid and gas phase does not affect the pressure since they are at the same temperature.

As illustrated, an electronic controller 16 (comprising a microprocessor and/or a computer) may be provided and configured to control all or some of the assembly of one or more valves of the device.

This withdrawal at the gaseous portion is more advantageous than a liquid withdrawal since it allows better renewal of the gas phase. Moreover, it limits the thermal gradient of this phase, and consequently minimizes the deviation from the equilibrium between the liquid and the vapours of the phases.

The device therefore makes it possible to control the pressure in the tank 2 with a gaseous withdrawal and a loop for internal recirculation in the liquid phase, if appropriate. The device can be movable and in particular can be subject to rotations with respect to three axes (Oxyz) which are greater than five degrees ° and accelerations along these axes which are greater than 0.5 g (which can result in liquid/gas mixtures, potentially giving rise to pressure instabilities in the devices of the prior art).

The device may be on board a boat, aircraft, truck at a fixed station or in the "full for empty" mode of use.

The device 1 advantageously has an auxiliary pressurization heater 9 for the initial pressurization of the tank and the starting up of the cell without withdrawal of fluid (before the mode of operation of permanent withdrawal described above).

Thus, the tank 2 is pressurized by the pressurization system separately from the withdrawal circuit preferably solely to ensure the starting up.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A fluid supply and storage device, comprising:
   a cryogenic tank configured to store liquefied fluid of a double-wall and vacuum-insulated type comprising an inner jacket delimiting a storage volume of the liquefied fluid and an outer jacket disposed around said inner jacket with a vacuum thermal insulation gap between said inner and outer jackets; and
   a withdrawal circuit comprising an assembly of one or more valves and a withdrawal line that comprises a first, upstream end connected to an upper part of said inner jacket and a second, downstream end configured to connect to a user member, said withdrawal line comprising a first heat exchanger located outside said inner jacket and a second heat exchanger located inside said inner jacket:
   a bypass line that fluidly connects the assembly of one or more valves with the second, downstream end, wherein:
   said assembly of one or more valves is configured to ensure passage of a flow of fluid circulating from said first, upstream end to said second, downstream end by switching between a first flow path in which the flow of fluid enters said first heat exchanger and then the flow of fluid enters said second heat exchanger and a second flow path in which the flow of fluid enters said first heat exchanger and the bypass line without entering said second heat exchanger; and
   an inlet of said first heat exchanger receiving the flow of fluid coming from said first, upstream end is located in said vacuum thermal insulation gap.

2. The device of claim 1, wherein at least a part of said first heat exchanger which is adjacent to said first heat exchanger inlet is located in said vacuum thermal insulation gap.

3. The device of claim 1, wherein said first heat exchanger is housed in an exchanger housing and at least one portion of said exchanger housing is located in said vacuum thermal insulation gap.

4. The device of claim 3, wherein said exchanger housing comprises a first inlet that receives the flow of fluid coming from said first, upstream end, said exchanger housing first inlet being located in said vacuum thermal insulation gap.

5. The device of claim 3, wherein said xchanger housing accommodates a part of said withdrawal circuit connecting said second heat exchanger to said second, downstream end, said exchanger housing further comprising a second inlet receiving the flow of fluid coming from said second exchanger, said exchanger housing second inlet being located in said vacuum thermal insulation gap.

6. The device of claim 1, wherein said withdrawal circuit further comprises a third heat exchanger disposed in series with, and downstream of, said second heat exchanger such that said third heat exchanger receives the flow of fluid that has passed into said second heat exchanger.

7. The device of claim 6, wherein said third heat exchanger is located outside said vacuum thermal insulation gap.

8. The device of claim 6, wherein said first heat exchanger and said third heat exchanger are housed in one and a same exchanger housing in a heat-exchange relationship with at least one flow of heat-transfer fluid.

9. The device of claim 6, wherein said assembly comprises a three-way valve, ports of said three-way valve being connected, respectively, to an outlet of said first heat exchanger, to an inlet of said second heat exchanger, and to said second, downstream end via a portion of said withdrawal circuit forming a bypass of said third heat exchanger.

10. The device of claim 9, wherein said portion of said withdrawal circuit forming a bypass of the third heat exchanger comprises a flow rate limiting calibrated orifice.

11. The device of claim 1, wherein said device further comprises a tank pressurization system for pressurizing said cryogenic tank, said tank pressurization system comprising a pressurization line separate from said withdrawal circuit that comprises:
   two ends connected, respectively, to said upper part of said inner jacket and a lower part of said inner jacket;
   a vaporization heat exchanger; and an assembly of one or more valves that is configured to allow liquid to be withdrawn from said cryogenic tank, to allow the withdrawn liquid to be heated in said vaporization heat exchanger, and to allow the heated withdrawn liquid be reintroduced into said cryogenic tank.

12. The device of claim 11, wherein said first heat exchanger, said third heat exchanger, and said vaporization heat exchanger are housed in a same exchanger housing.

13. The device of claim 1, further comprising an electronic controller configured to control all or some of said assembly of one or more valves.

14. The device of claim 1. wherein the, user member is fluidly connected with the second, downstream end, wherein the user member comprises a fuel cell or a motor connected said second, downstream end.

15. The device of claim 1, wherein said device is an on-board device for storing hydrogen and supplying it to a user member.

16. A vehicle that includes said device of claim 1.

17. The vehicle of claim 16, wherein said vehicle is a boat.

18. A method for supplying fluid to the user member using said device of claim 11, wherein the user member is connected to said second, downstream end, said method comprising the steps of:
   supplying fluid from said tank to said user member by withdrawing liquefied fluid from said tank via said withdrawal line; and
   prior to said step of supplying fluid, when a pressure within said tank is less than a determined threshold, pressurizing said tank via said device of claim 11 up to a determined pressure level.

* * * * *